(12) United States Patent
Dupuis et al.

(10) Patent No.: US 10,520,360 B1
(45) Date of Patent: Dec. 31, 2019

(54) AUTOMATED POWER-IN-THE-BUCKET MEASUREMENT APPARATUS FOR LARGE APERTURE LASER SYSTEMS

(71) Applicant: NORTHROP GRUMMAN SYSTEMS CORPORATION, Falls Church, VA (US)

(72) Inventors: Michael L. Dupuis, Culver City, CA (US); Daniel K. Smith, Redondo Beach, CA (US); Daniel Lam, Monterey Park, CA (US); Christopher J. Lieto, Agoura Hills, CA (US); Michael E. Farey, Palmdale, CA (US); Joshua E. Rothenberg, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 39 days.

(21) Appl. No.: 16/050,060

(22) Filed: Jul. 31, 2018

(51) Int. Cl.
| | |
|---|---|
| *G01J 1/42* | (2006.01) |
| *G01J 1/04* | (2006.01) |
| *G01J 1/44* | (2006.01) |

(52) U.S. Cl.
CPC .......... *G01J 1/4257* (2013.01); *G01J 1/0422* (2013.01); *G01J 1/44* (2013.01)

(58) Field of Classification Search
CPC ................. G01J 2001/4261; G01J 1/4257
See application file for complete search history.

(56) References Cited

U.S. PATENT DOCUMENTS

| | | | |
|---|---|---|---|
| 4,828,384 A | * | 5/1989 | Plankenhorn ............. G01J 1/02 356/121 |
| 5,069,527 A | | 12/1991 | Johnston, Jr. et al. |
| 5,078,491 A | | 1/1992 | Johnston, Jr. |

(Continued)

OTHER PUBLICATIONS

Slater, John M. and Edwards, Brian; "Characterization of High-Power Lasers", Laser Technology for Defense and Security VI, Ed. Mark Dubinski & Stephen G. Post; Orlando, Florida USA: SPIE, 2010, 76860W—Dec. 2010 Copyright SPIE—The International Society for Optical Engineering. 12 pgs.

(Continued)

*Primary Examiner* — Shawn Decenzo
(74) *Attorney, Agent, or Firm* — John A. Miller; Shumaker, Loop & Kendrick, LLP

(57) ABSTRACT

A beam quality measurement system for determining beam quality of a high power laser beam from a laser system by power-in-the-bucket (PIB) measurements in a laboratory environment. The system includes a beam compressor assembly for compressing the diameter of the laser beam, and a diagnostic bench assembly that receives the reduced diameter low power beam from the beam compressor assembly. The bench assembly includes a pinhole array positioned at a focal plane of a lens and that includes a plurality of different sized pinholes and a translation stage for moving the pinhole array. The bench assembly also includes a power meter that receives the focused beam after it has passed through a pinhole in the pinhole array, where the power meter generates a signal that causes the stage to move the pinhole array to position another pinhole when the power meter identifies a maximum power received from one pinhole.

20 Claims, 3 Drawing Sheets

(56) References Cited

U.S. PATENT DOCUMENTS

| | | | | |
|---|---|---|---|---|
| 5,329,350 | A * | 7/1994 | Wright | G01J 1/04 |
| | | | | 356/218 |
| 7,453,070 | B2 * | 11/2008 | Gupta | G01J 1/04 |
| | | | | 250/397 |
| 9,709,438 | B2 * | 7/2017 | Robertson | G01J 1/4257 |
| 10,050,408 | B2 * | 8/2018 | Suzuki | G02B 27/106 |
| 2005/0006559 | A1 * | 1/2005 | Smith | G01J 1/4257 |
| | | | | 250/201.9 |
| 2006/0049331 | A1 * | 3/2006 | Smith | G01J 1/4257 |
| | | | | 250/201.9 |
| 2008/0198371 | A1 | 8/2008 | Widen | |
| 2012/0138805 | A1 * | 6/2012 | Missalla | G01J 1/0437 |
| | | | | 250/362 |
| 2012/0212802 | A1 * | 8/2012 | Rothenberg | H01S 3/06754 |
| | | | | 359/341.1 |
| 2015/0338266 | A1 * | 11/2015 | Wishstar | G01J 1/0437 |
| | | | | 250/206.2 |
| 2018/0209783 | A1 * | 7/2018 | Nomaru | G01J 1/0403 |
| 2019/0025536 | A1 * | 1/2019 | Barnhart | G01J 1/4257 |
| 2019/0061065 | A1 * | 2/2019 | Izumi | B23K 26/064 |
| 2019/0086258 | A1 * | 3/2019 | Kramer | G01J 1/4257 |

OTHER PUBLICATIONS

Slater, Jack on behalf of the High Energy Laser Joint Technology Office; "A Beam Quality Metric for High Energy Lasers", Jul. 30, 2014, Cleared for Public Release. Distribution A. Case 377ABW-2014-0665. 18 pgs.

* cited by examiner

AUTOMATED POWER-IN-THE-BUCKET MEASUREMENT APPARATUS FOR LARGE APERTURE LASER SYSTEMS

BACKGROUND

Field

This disclosure relates generally to a beam quality measurement system for determining beam quality of a laser beam by power-in-the-bucket (PIB) measurements and, more particularly, to a beam quality measurement system for determining beam quality of a high power, large diameter laser beam by PIB measurements, where the system employs a beam compressor telescope for reducing the diameter of the laser beam and a diagnostic bench assembly that uses an automatic pinhole assembly for selecting different pinholes.

Discussion of the Related Art

Lasers employed by high performance directed energy (DE) laser weapons systems must have excellent beam quality. Beam quality of a laser beam is a measure of the deviation of the beam from a theoretically perfect beam. There are several methods known in the art for determining beam quality, for example, PIB measurements and knife edge testing, where PIB measurements are the preferred method for directed energy laser weapons systems because it provides a finite measure of power in a far-field spot, which ultimately represents irradiance on a target. PIB can be defined as the ratio of power measured in a given far-field angle (bucket) to the total power. A PIB curve is produced that is a plot of PIB values versus bucket radius, i.e., units of wavelength divided by aperture diameter.

In general, existing PIB measurement techniques can be broken down into two categories, namely, finite and software. Finite PIB consists of a collection of discrete measurements, where the laser beam being tested is focused through a pinhole corresponding to a specific far-field angular bucket, and the power through the pinhole is measured. A PIB curve is generated utilizing finite techniques by performing the power-through-pinhole measurements using many pinholes of various diameters. Software PIB techniques can quickly produce an entire PIB curve with a singular image by processing the image of the far-field spot on a sensor. More particularly, instead of using physical pinholes, image processing techniques can be used to create virtual pinholes and summing power inside specific diameters to generate a full PIB curve from a single image. Each technique has its advantages and disadvantages. Software PIB measurements are faster and not sensitive to bucket alignments, but are increasingly influenced by noise for larger bucket sizes, whereas finite PIB measurements are slower and alignment sensitive, but are not limited by noise for larger bucket sizes.

Directed energy laser weapons systems attempt to maximize PIB at small bucket radiuses, which translates to maximized irradiance on a target. Though the determination of PIB is critical for performance evaluation, current PIB measurement techniques for large aperture, high-power systems can be improved. Generally, PIB measurements for small diameter beams are conducted in a laboratory environment. However, PIB measurements for large diameter beams cannot be conducted in such an environment using a traditional optical system. Therefore, directed energy laser weapons systems that have an exit beam size far exceeding conventional optical component diameter, must be evaluated at outdoor test ranges. At such testing facilities, directed energy laser weapons systems, which are incapable of focusing beams over a short focal distance, focus beams several kilometers downrange to a PIB measurement apparatus. The PIB values generated by the measurement not only have system induced errors, but atmospheric induced degradation. Thus, at range PIB measurements are insufficient for the evaluation of ideal laser system performance.

In addition, current PIB measurement techniques are time consuming. In order to collect a single PIB measurement, conventional PIB measurement systems must align their optical assembly to pass a beam through a single pinhole, which is a time and labor intensive process. Thus, the generation of PIB curves, which requires a large number of samples, i.e., buckets, for sufficient accuracy, is a labor and time intensive procedure with standard PIB measurement techniques.

Further, the logistics associated with high energy laser beam operations are extremely involved. Specifically, personnel are required to take extensive precautions to satisfy laser safety concerns, and are often unable to work within the vicinity of an active lasing area. For PIB measurements using conventional systems that require involved alignment to interchange pinholes, laser beam safety constraints result in an even larger measurement timeline.

Furthermore, it is vital to mitigate the effect of the measurement apparatus on the system under test. In the case of PIB measurement systems, surface errors from optical components degrade beam quality, and this degradation is reflected in the PIB measurements. Conventional systems seek to mitigate induced error by the use of high-quality surfaces, but cumulative surface errors can still be significant. In addition to controlling induced surface error, system alignment must be maintained for a quality PIB measurement.

Also, alignment between the optical axis of the laser system under test and the optical axis of the measurement apparatus is crucial. Milli-radian scale tilt must be maintained between the two systems. This is particularly difficult for large-aperture directed energy systems that are fixed in space.

SUMMARY

The following discussion discloses and describes a beam quality measurement system for determining beam quality of a high power, large diameter laser beam from a laser system by power-in-the-bucket (PIB) measurements in a laboratory environment. The system includes a beam compressor assembly for compressing the diameter of the high power laser beam, where the beam compressor assembly includes an outer enclosure and an input window through which the high power laser beam enters the enclosure. The beam compressor assembly further includes a beam compressing telescope that receives the high power laser beam from the input window and reduces the diameter of the high power beam. The beam compressor assembly also includes a high power beam splitter that splits the reduced diameter beam into a reduced diameter high power beam and a reduced diameter low power beam. A diagnostic bench assembly receives the reduced diameter low power beam from the beam compressor assembly, and includes a lens that focuses the reduced diameter low power beam and a plurality of optical components including a plurality of beam splitters and a plurality of folding optics. The diagnostic bench assembly further includes a pinhole array assembly having a pinhole array positioned at a focal plane of the lens and that includes a plurality of different sized pinholes and a translation stage for moving the pinhole array in three degrees of freedom so as to selectively position the pinholes at a focal point of the lens in the focal plane. The diagnostic bench assembly also includes a power meter that receives the focused beam after it has passed through a pinhole in the pinhole array and measures the power of the focused beam, where the power meter generates a signal that causes the translational stage to move the pinhole array so that another pinhole in the array is positioned at the focal point of the lens when the power meter identifies a maximum power received from one pinhole.

Additional features of the disclosure will become apparent from the following description and appended claims, taken in conjunction with the accompanying drawings.

DETAILED DESCRIPTION OF THE EMBODIMENTS

Figure 1:
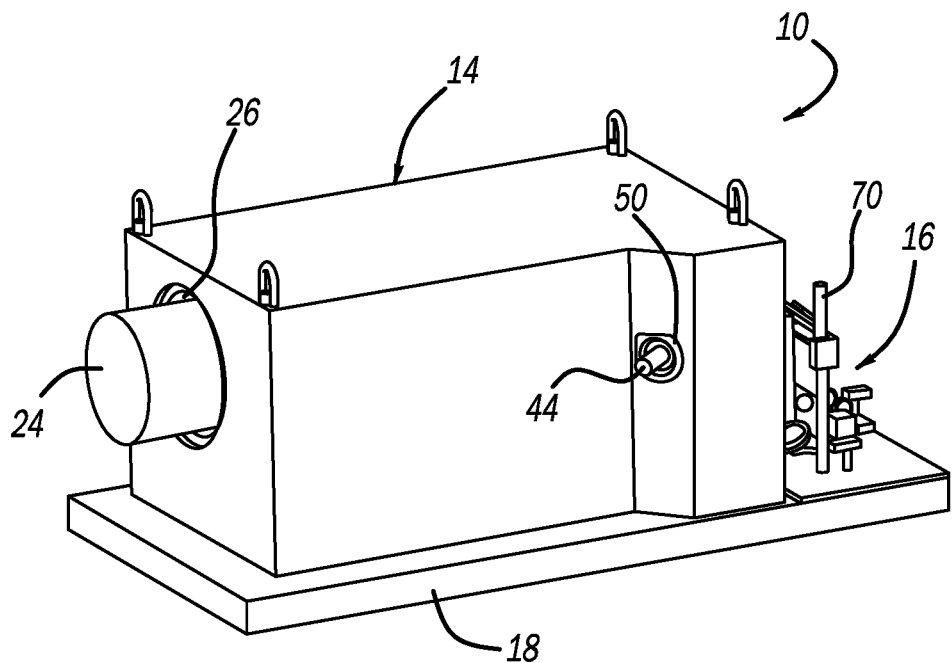
FIG. 1 is a front isometric view of a beam quality measurement system that employs PIB measurements.

The following discussion of the embodiments of the disclosure directed to a beam quality measurement system for determining laser beam quality by power-in-the-bucket (PIB) measurements is merely exemplary in nature, and is in no way intended to limit the disclosure or its applications or uses.

This disclosure describes a beam quality measurement system for determining laser beam quality by power-in-the-bucket (PIB) measurements that has particular relevance for beam quality characterization of directed energy laser weapons systems, including provisions to characterize high energy laser (HEL) systems. As will be discussed in detail below, the system autonomously conducts laser beam PIB measurements, measures a PIB curve, and is capable of measuring beam quality for large aperture, high-power laser systems. The system is scalable to any aperture size and output power and includes automated alignment and calibration features.

The beam quality measurement system disclosed herein determines beam quality without significant influence from the atmosphere. As discussed above, existing PIB testing for large aperture directed energy systems are conducted at a test range. PIB is determined by lasing over an extended propagation distance, resulting in atmospheric induced degradation of the beam. In order to isolate the beam quality of the system from the combined beam quality including system and atmospheric effects, the atmosphere must be characterized. These at-range alternatives would require additional equipment, for example, adaptive optics systems including a beacon and wavefront sensor, which are expensive and complicated optical sub-systems. Regardless, at range alternatives lack the advantages of PIB measurements in a factory/laboratory environment, where the system can be tuned to meet performance parameters.

Non-automated PIB measurement techniques are standard, but lack the advantages provided by the testing system discussed herein. The beam quality measurement system discussed herein provides pinholes on a single surface that are autonomously positioned using a motorized stage. Alternative schemes could utilize different methods for pinhole positioning, for example, a motorized rotational stage with a single pinhole at each spot. But these systems lack the precision alignment (sub-micron scale) capabilities afforded by an encoded translation stage.

The beam quality measurement system disclosed herein mitigates for induced surface error and misalignment and compensates for known errors by adjusting telescope focus. One alternative to this approach would be the addition of an adaptive optics system that included a deformable mirror and wavefront sensor. Though this would be a robust approach to wavefront correction, the package, cost and complexity of adaptive optics systems are large compared to a single linear stage. Another approach would be to introduce focus by actuating a component other than the beam compression telescope. However, this would remove the ability to adjust alignment on the most sensitive system components. Also, a static compensation plate could be considered, but it would not be able to dynamically respond to changes in system alignment, which would change the system wavefront. In regard to system alignment, alternatives could employ active line-of-sight control utilizing position sensing detectors (PSDs) driving actuated mirrors in a control loop. The beam quality measurement system could interface to these mirrors using the already present PSD, but does not baseline this capability due to added complexity and cost.

The beam quality measurement system disclosed herein proposes mating optical axes of measurement and laser systems by utilizing sensor feedback from an outgoing alignment beacon and incoming laser beam. Alternatives to this approach exist, such as laser positioning or photogrammetry, but require equipment external to the laser system. In addition, these methods lack direct verification of beam clearance through the optical train.

The beam quality measurement system disclosed herein provides novel capabilities compared to standard PIB measurement techniques. In particular, the system allows for PIB measurements of large aperture, high power laser systems in a factory/laboratory setting. As discussed above, the current approach to generating PIB measurements for integrated directed energy systems is to test at-range, as existing PIB measurement devices cannot accommodate large diameter beams. The beam quality measurement system receives, compresses and analyzes the full aperture laser beam to determine isolated laser system PIB in a factory/laboratory setting. The beam quality measurement system removes several disadvantages associated with the existing approach for at-range PIB testing. PIB measurement data gathered at range incorporates atmospheric degradation caused by turbulence and extinction, and is not indicative of isolated laser system performance. Range testing is also extremely costly and logistically involved, requiring external test facilities. Furthermore, PIB measurement data gathered in a factory/laboratory can be utilized to tune system performance during integration, whereas directed energy systems are generally fixed when at test ranges. Also, the beam quality measurement system accepts beams of diameter equal to or less than the clear aperture of the input window, allowing for beams of varying shape, size, and power to be characterized. The beam quality measurement system can be utilized for PIB measurements of several different laser systems.

In addition, the beam quality measurement system disclosed herein provides for an automated generation of PIB measurement data and curves. As discussed above, existing methods for PIB measurements require extremely involved alignment for each pinhole under test. The beam quality measurement system removes this human-in-the-loop alignment process, utilizing a precision encoded motorized stage to travel to predefined pinhole locations. A PIB measurement curve is quickly generated by moving through the buckets on the pinhole array surface. In addition, the present system mitigates the logistical and safety concerns associated with aligning a system intended for high power test. Thus, the system significantly improves testing schedule, reduces associated costs, and increases personnel safety.

In addition, the beam quality measurement system disclosed herein provides for induced error compensation. As discussed above, existing PIB measurement systems induce additional degradation of beam quality due to component surface errors. The beam quality measurement system disclosed herein includes an actuated telescope, which is utilized to maintain system alignment and compensates for surface errors through adjustment of telescope focus. This approach results in more accurate PIB measurements.

Figure 2:
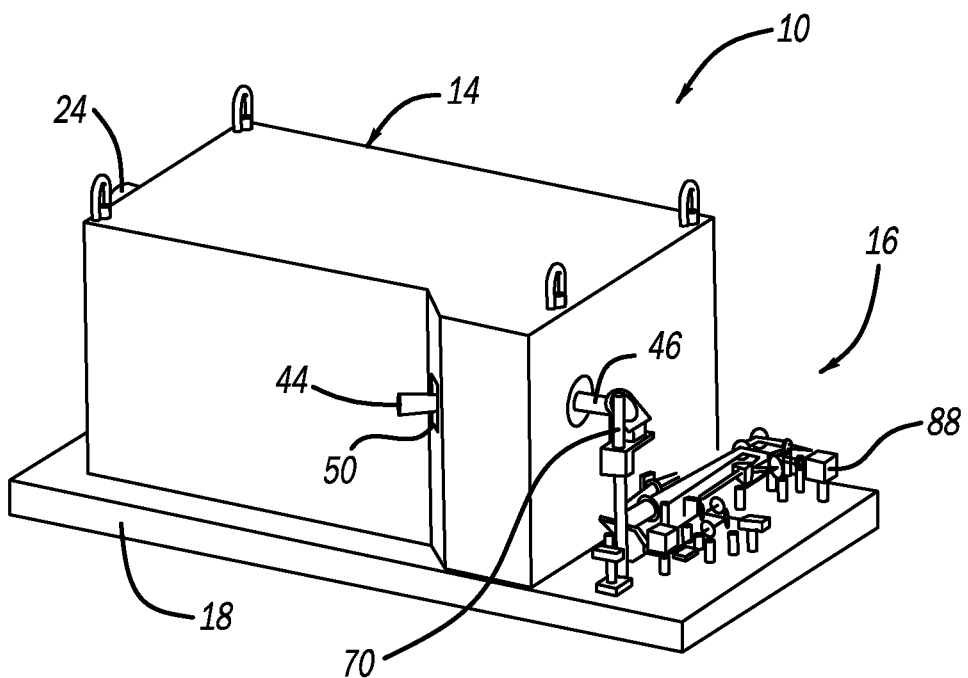
FIG. 2 is a rear isometric view of the beam quality measurement system.
Figure 3:
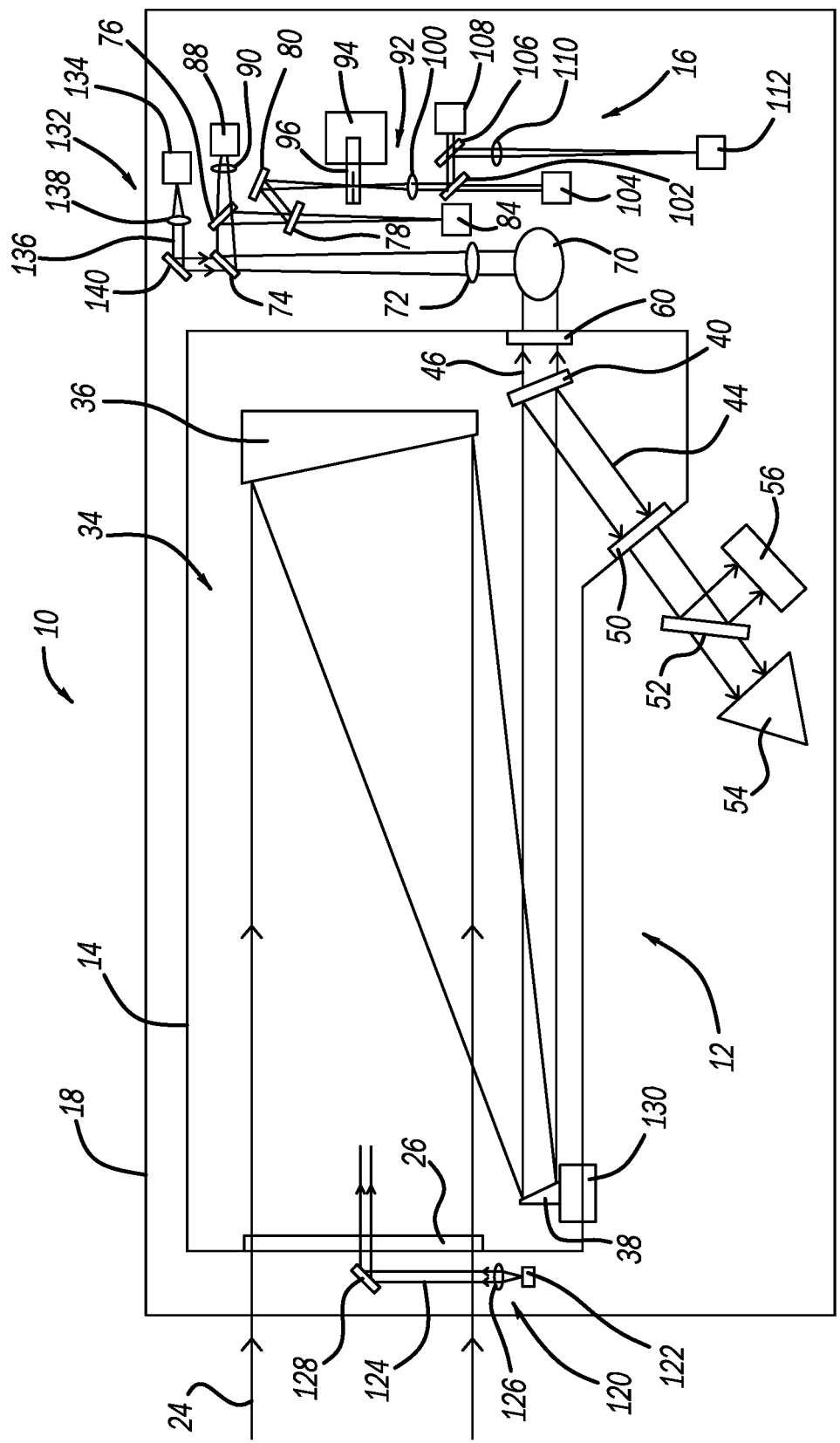
FIG. 3 is a schematic diagram of the beam quality measurement system shown in FIG. 1 including a beam compressor assembly and a diagnostic bench assembly.

FIG. 1 is a front isometric view, FIG. 2 is a rear isometric view and FIG. 3 is schematic diagram of a beam quality measurement system 10 of the type discussed above. The system 10 includes a beam compressor assembly 12 provided within an enclosure 14 and a diagnostic bench assembly 16 both mounted on a platform 18. The beam compressor assembly 12 is an optical sub-system that is designed to receive a large-diameter, high power laser beam 24 under test through an input window 26, de-magnify the beam 24 to a smaller workable diameter, and relay the beam 24 to downstream components. The laser beam 24 can be provided by any suitable laser system (not shown), such as a fiber laser amplifier system in a directed energy laser weapons system. In order to accept high-energy input beams, the beam compressor assembly 12 is contained within the enclosure 14 and high-reflection (HR) or anti-reflection (AR) coatings are applied to components at the beam wavelength. The diameter of the beam 24 may be equal to or less than the maximum clearance aperture of the input window 26, which allows systems of various output beam diameters to be tested by the system 10.

The beam 24 enters the beam compressor assembly 12 through the input window 26 along the optical axis of the measurement system 10. The beam 24 is then compressed or reduced in diameter by a beam compression telescope 34, for example, an off-axis parabolic telescope, that includes a primary mirror 36 that receives the beam 24 from the window 26 and a secondary mirror 38 that receives the reflected beam from the primary mirror 36. The off-axis telescope 34, rather than an on-axis telescope, is utilized so as to accommodate beams of any obscuration ratio. The smaller diameter beam 24 then propagates from the secondary mirror 38 to a dichroic beam sampler 40, which is coated to reflect the majority of the beam 24 as beam 44, and transmit a residual amount of the beam 24 as beam 46. The high power beam 44 exits the enclosure 14 through a window 50 and is directed to a beam sampler 52 that transmits part of the beam 44 to a beam dump 54 to dispose of a large portion of the beam power and reflects part of the beam 44 to a power meter 56 that measures the power of the high power beam 44 that can be used to calibrate the low power beam 46, which is discussed further below.

The low power beam 46 exits the enclosure 14 through a window 60 to the beam diagnostics assembly 16. As will be discussed in detail below, the diagnostic bench assembly 16 is an optical sub-system designed to provide PIB measurements for the low power laser beam 46. A periscope 70 in the diagnostic bench assembly 16 lowers the working height of the beam 46 and then the lowered beam 46 is focused by a long focal length lens 72. The focused beam 46 is then split into several paths by dichroic beam splitters 74, 76 and 78, which reflect and refract portions of the beam 46 at the laser wavelength. One beam path focuses the beam 46 onto a position sensing detector (PSD) 84 to measure jitter of the beam to characterize movement of the system 10. Another beam path passes the beam 46 to an integrating sphere or power meter 88 through a lens 90 that is calibrated to the high power measurement provided by the power meter 56, which measures the total power of the beam 46. Once the power meter 88 is calibrated to the high power beam 44, the power meter 56 can be removed from the system 10.

Figure 4:
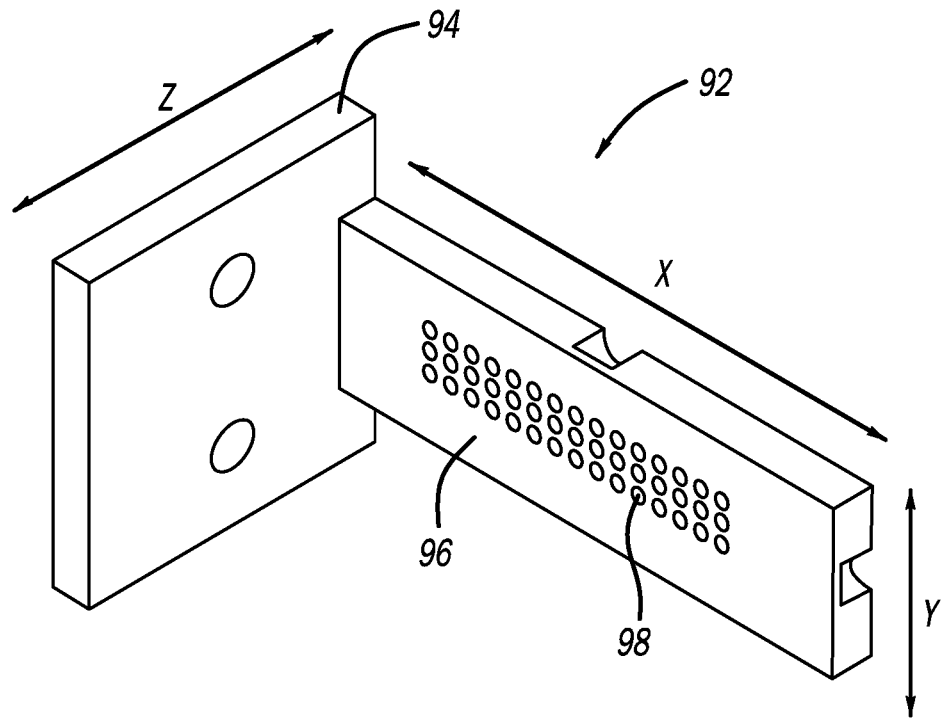
FIG. 4 is an isometric view of an automated pinhole array assembly used in the diagnostic bench assembly.

The beam 46 is reflected off of a mirror 80 and is focused by the lens 72 to an intermediary focal plane. A pinhole assembly 92 is positioned at the focal plane and includes a motorized and encoded X/Y/Z translation stage 94 and a pinhole array 96 attached thereto, where the pinhole array 96 is a single surface having an array of precision machined pinholes 98. The pinholes 98 are of a different size and correspond to pre-defined far-field bucket sizes, such that for a given PIB measurement, the pinhole array 96 is aligned by the stage 94 to pass the beam 46 through a single one of the pinholes 98. FIG. 4 is an isometric view of the pinhole assembly 92. After the beam 46 passes through the pinhole 98 it is collimated by a lens 100 and passes through a dichroic beam splitter 102 to another integrating sphere or power meter 104 that measures power-in-the-bucket for the corresponding pinhole 98. The portion of the beam that is split off by the splitter 102 is split again by a dichroic beam splitter 106 and one part of that split beam is imaged onto a near-field (collimated) camera 108 and the other part of that split beam is focused by a lens 110 and imaged on a far-field (focused) beam profiler camera 112. The far-field beam profiler camera 112 is calibrated to the upstream power measurement and can also be utilized to generate PIB values.

Figure 5:
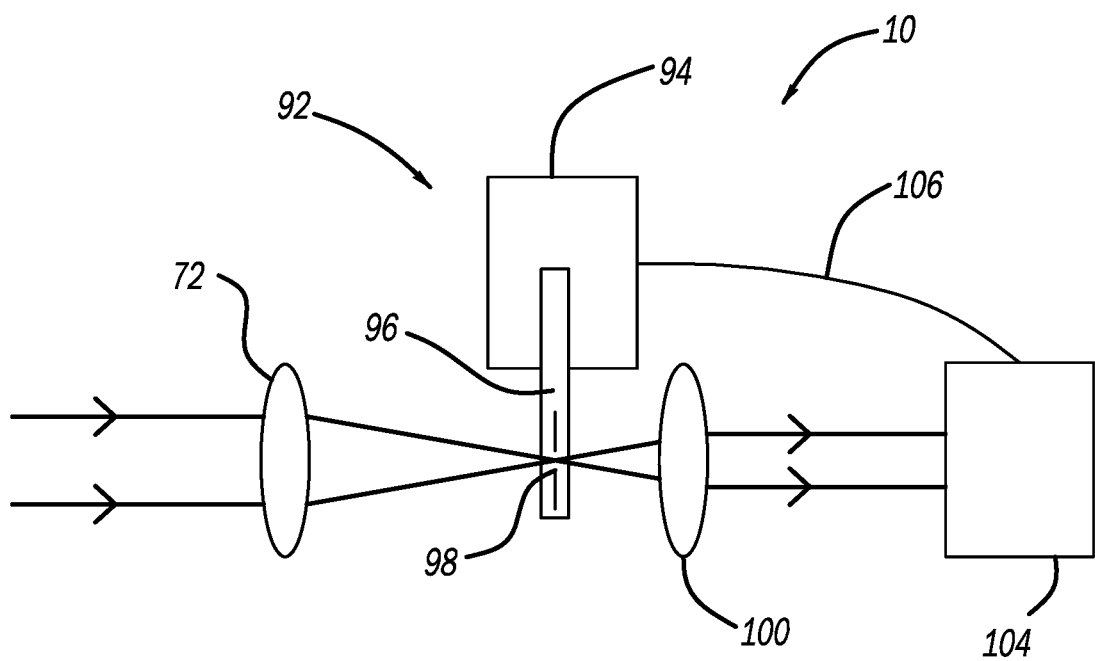
FIG. 5 is a schematic diagram of a PIB measurement portion in the diagnostic bench assembly.

The system 10 as described is able to provide autonomously gathered PIB measurements. FIG. 5 is a schematic diagram of a portion of the system 10 showing the motorized stage 94 and the integrating sphere 104. The position of the pinhole array 96 is controlled by the translation stage 94, where Z is along the optical axis and the X/Y plane is perpendicular to the optical axis. Coarse X/Y/Z coordinates of each pinhole location is known and stored. The system uses the stage 94 to translate to a coarse pinhole location, reads power through that pinhole 98 by the power meter 104, and adjusts the stage 94 to maximize power throughput by, for example, a dithering loop. A power signal from the power meter 104 is sent to the stage 94 on line 106 so that the stage 94 knows when the maximum power is achieved for one pinhole 98 so that it can then move onto the next pinhole 98. The X/Y/Z coordinates that maximize power through the pinhole 98 is recorded and a PIB measurement is provided. This process is repeated for each pinhole 98 to autonomously construct a PIB curve so as to display the power at each far-field bucket (pinhole). An iteration also exists that utilizes a single human-in-the-loop alignment step to predetermine X/Y/Z coordinates that map to pinhole locations. The system 10 can then autonomously translate to these pinhole locations and generate a PIB curve.

The system 10 further includes a beam alignment assembly 120 including an alignment beam source 122 generating an alignment beam 124 that is collimated by a collimating lens 126, redirected by a mirror 128 and is injected through the input window 26 into the beam compressor assembly 12 along the optical axis of the system 10 and travels to the beam profiler cameras 108 and 112 in the diagnostic bench assembly 16. System misalignments register in deviation from the aligned pixel location of the beam 24 on the beam profiler cameras 108 and 112. The alignment beam 124 is removed from the optical path during PIB measurements, by, for example, a motorized translation stage (not shown).

The system 10 also includes a focus drive in the beam compressor assembly 12 that adjusts primary to secondary mirror separation by placing the secondary mirror 38 on a motorized, encoded linear translation stage 130, positioned along the chief-ray of the telescope 34. By adjusting the mirror separation, controlled amounts of focus can be introduced or removed from the system 10. This allows for compensation of aberrations introduced by the diagnostic bench assembly 16, which would otherwise contribute to reduced laser beam quality, thus reducing the accuracy of the PIB measurement. This compensation is achieved by introducing a laser beam (not shown) of known beam quality to the measurement system 10, measuring PIB, and adjusting system focus to minimize differences between known and recorded beam quality. If the quality of the alignment beam 124 is known, then that beam can be used for this purpose.

In order to aid in the coupling between the optical axis of the laser beam 24 and the optical axis of the system 10, an alignment beacon beam assembly 132 is provided in the diagnostic bench assembly 16 that includes a cooperative laser source 134 that generates an alignment beacon beam 136 that is co-boresighted with the system optical axis. The beacon beam 136 is focused by a lens 138 and directed by a mirror 140 through the beam splitter 74 and into the beam compressor assembly 12. Laser systems with co-boresighted sensors are able to image the cooperative beacon and adjust relative system alignment to align the beacon pixel location on the sensors to a pre-defined aligned position. Simultaneously, the system 10 will image the laser beam 24 and relative system alignment can be adjusted to match an aligned pixel location. This eliminates misalignment between the beam 24 and the system 10 as an error source in the PIB measurement.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A beam quality measurement system for measuring the beam quality of a high power laser beam from a laser system in a laboratory environment, said system comprising:
    a beam compressor assembly for compressing the diameter of the high power laser beam, said beam compressor assembly including an outer enclosure and an input window through which the high power laser beam enters the enclosure, said beam compressor assembly further including a beam compressing telescope that receives the high power laser beam from the input window and reduces the diameter of the high power beam, said beam compressor assembly further including a first high power beam splitter that splits the reduced diameter beam into a reduced diameter high power beam and a reduced diameter low power beam; and
    a diagnostic bench assembly that receives the reduced diameter low power beam from the beam compressor assembly, said diagnostic bench assembly including a first lens that focuses the reduced diameter low power beam and a plurality of optical components including a plurality of beam splitters and a plurality of folding optics, said diagnostic bench assembly further including a pinhole array assembly having a pinhole array positioned at a focal plane of the first lens and including a plurality of different sized pinholes and a translation stage for moving the pinhole array in three degrees of freedom so as to selectively position the pinholes at a focal point of the first lens in the focal plane, said diagnostic bench assembly further including a first power meter that receives the focused beam after it has passed through a pinhole in the pinhole array and measures the power of the focused beam, wherein the first power meter generates a signal that causes the translational stage to move the pinhole array so that another pinhole in the array is positioned at the focal point of the first lens when the first power meter identifies a maximum power received from one pinhole.

2. The system according to claim 1 wherein the pinhole array assembly maximizes power through a particular pinhole by using a dithering loop and recording X/Y/Z coordinates for the maximum power for each pinhole in the array so as to generate a PIB curve.

3. The system according to claim 1 wherein the diagnostic bench assembly includes a second lens positioned between the pinhole array and the first power meter that collimates the focused beam onto the first power meter.

4. The system according to claim 3 wherein one of the beam splitters splits the collimated beam from the second lens onto a near-field camera for beam profiling purposes.

5. The system according to claim 3 wherein one of the beam splitters splits the collimated beam from the second lens and sends it to a third lens that focuses the collimated beam onto a far-field camera for beam profiling purposes.

6. The system according to claim 1 wherein the diagnostic bench assembly includes a position sensing detector that is positioned at the focal plane of the first lens and measures the position of the focused beam so as to identify jitter in the low power beam.

7. The system according to claim 1 further comprising a second high power beam splitter positioned outside of the enclosure and receiving the high power beam from the first beam splitter, said second beam splitter splitting the beam into a high power beam portion that is sent to a heat dump and low power beam portion that is received by a second power meter, said second power meter measuring the power of the beam for calibrating the low power beam.

8. The system according to claim 1 further comprising an alignment beam source that generates an alignment beam that is directed into the input window and propagates to the diagnostic bench assembly.

9. The system according to claim 1 further comprising an alignment beacon source that generates and directs an alignment beacon beam into the diagnostic bench assembly for co-boresighting purposes between the beam compressor assembly and the high power beam.

10. The system according to claim 1 wherein the diagnostic bench assembly further includes a second power meter for measuring the power of the diagnostic beam so as to calibrate the low power beam to the high power beam.

11. The system according to claim 1 wherein the compressing telescope includes a primary mirror that receives the high power beam from the input window and a secondary mirror that receives the high power beam from primary mirror and reduces its diameter, said beam compressor assembly including a movement device that moves the secondary mirror so as to control the focus of the telescope.

12. A beam quality measurement system for measuring the beam quality of a high power laser beam from a laser system in a laboratory environment, said system comprising:
 a beam compressor assembly for compressing the diameter of the high power laser beam and splitting the high power beam into a reduced diameter high power beam and a reduced diameter low power beam; and
 a diagnostic bench assembly that receives the reduced diameter low power beam from the beam compressor assembly, said diagnostic bench assembly including a pinhole array assembly having a pinhole array including a plurality of different sized pinholes and a translation stage for moving the pinhole array in three degrees of freedom so as to selectively position the pinholes at a focal point of a first lens, said diagnostic bench assembly further including a first power meter that receives the focused beam after it has passed through a pinhole in the pinhole array and measures the power of the focused beam.

13. The system according to claim 12 wherein the pinhole array assembly maximizes power through a particular pinhole by using a dithering loop and recording X/Y/Z coordinates for the maximum power for each pinhole in the array so as to generate a PIB curve.

14. The system according to claim 12 wherein the diagnostic bench assembly includes a second lens positioned between the pinhole array and the first power meter that collimates the focused beam onto the first power meter.

15. The system according to claim 14 wherein one of the beam splitters splits the collimated beam from the second lens onto a near-field camera for beam profiling purposes.

16. The system according to claim 14 wherein one of the beam splitters splits the collimated beam from the second lens and sends it to a third lens that focuses the collimated beam onto a far-field camera for beam profiling purposes.

17. The system according to claim 12 wherein the diagnostic bench assembly includes a position sensing detector that is positioned at the focal plane of the first lens and measures the position of the focused beam so as to identify jitter in the low power beam.

18. A beam quality measurement system for measuring the beam quality of a high power laser beam from a laser system in a laboratory environment, said system comprising:
 a beam compressor assembly for compressing the diameter of the high power laser beam, said beam compressor assembly including an outer enclosure and an input window through which the high power laser beam enters the enclosure, said beam compressor assembly further including a beam compressing telescope that receives the high power laser beam from the input window and reduces the diameter of the high power beam, said beam compressor assembly further including a first high power beam splitter that splits the reduced diameter beam into a reduced diameter high power beam and a reduced diameter low power beam;
 a diagnostic bench assembly that receives the reduced diameter low power beam from the beam compressor assembly, said diagnostic bench assembly including a first lens that focuses the reduced diameter low power beam and a plurality of optical components including a plurality of beam splitters and a plurality of folding optics, said diagnostic bench assembly further including a pinhole array assembly having a pinhole array positioned at a focal plane of the first lens and including a plurality of different sized pinholes and a translation stage for moving the pinhole array in three degrees of freedom so as to selectively position the pinholes at a focal point of the first lens in the focal plane, said diagnostic bench assembly further including a first power meter that receives the focused beam after it has passed through a pinhole in the pinhole array and measures the power of the focused beam, and a position sensing detector that is positioned at the focal plane of the first lens and measures the position of the focused beam so as to identify jitter in the low power beam, and a second lens positioned between the pinhole array and the first power meter that collimates the focused beam onto the first power meter, wherein the first power meter generates a signal that causes the translational stage to move the pinhole array so that another pinhole in the array is positioned at the focal point of the first lens when the first power meter identifies a maximum power received from one pinhole; and
 a second high power beam splitter positioned outside of the enclosure and receiving the high power beam from the first beam splitter, said second beam splitter splitting the beam into a high power beam portion that is sent to a heat dump and low power beam portion that is received by a second power meter, said second power meter measuring the power of the beam for calibrating the low power beam.

19. The system according to claim 18 wherein one of the beam splitters splits the collimated beam from the second lens onto a near-field camera for beam profiling purposes.

20. The system according to claim 18 wherein one of the beam splitters splits the collimated beam from the second lens and sends it to a third lens that focuses the collimated beam onto a far-field camera for beam profiling purposes.

* * * * *